United States Patent
Ichinose et al.

(10) Patent No.: US 8,960,878 B2
(45) Date of Patent: Feb. 24, 2015

(54) INK JET INK, INK JET RECORDING METHOD, AND INK CARTRIDGE

(75) Inventors: Hirofumi Ichinose, Tokyo (JP); Daiji Okamura, Tokyo (JP); Kousuke Yamasaki, Kawasaki (JP); Mitsuru Ishii, Kamagaya (JP); Yuuki Nishino, Tokyo (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 13/175,165

(22) Filed: Jul. 1, 2011

(65) Prior Publication Data

US 2012/0001980 A1 Jan. 5, 2012

(30) Foreign Application Priority Data

Jul. 5, 2010 (JP) .................................. 2010-153079

(51) Int. Cl.
*B41J 2/01* (2006.01)
*C09D 11/322* (2014.01)
*B41J 2/21* (2006.01)
*C09D 11/326* (2014.01)

(52) U.S. Cl.
CPC ............. *C09D 11/322* (2013.01); *B41J 2/2107* (2013.01); *B41J 2/01* (2013.01); *C09D 11/326* (2013.01)
USPC ................................ 347/100; 347/95; 523/160

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ............. 347/100, 95, 96, 101, 102, 20, 21, 9, 347/88; 106/31.6, 31.13, 31.27; 523/160, 523/161

See application file for complete search history.

(56) References Cited

U.S. PATENT DOCUMENTS

| | | | | |
|---|---|---|---|---|
| 5,656,701 | A * | 8/1997 | Miyamoto et al. | 525/453 |
| 2007/0141264 | A1* | 6/2007 | Satgurunathan et al. | 427/384 |
| 2010/0055322 | A1* | 3/2010 | Brust et al. | 427/256 |
| 2010/0239830 | A1* | 9/2010 | Ohnishi et al. | 428/195.1 |
| 2010/0309260 | A1* | 12/2010 | Hakiri et al. | 347/100 |

FOREIGN PATENT DOCUMENTS

| | | |
|---|---|---|
| JP | 2005-515289 T | 5/2005 |
| JP | 2008-143960 A | 6/2008 |

OTHER PUBLICATIONS

Science Lab. Com, Inc. (Oct. 10, 2005) Material Safety Data Sheet Polypropylene Glycol 2000 MSDS, pp. 1-5.*

* cited by examiner

*Primary Examiner* — Manish S Shah
(74) *Attorney, Agent, or Firm* — Canon U.S.A., Inc. IP Division

(57) ABSTRACT

An ink jet ink containing a pigment and a polyurethane polymer, wherein the polyurethane polymer has units derived from a polyol having no acid group and having the carbon number of 13 or more and 250 or less, a diol having an acid group and having the carbon number of 1 or more and 7 or less, a polyol having a siloxane structure, and a polyisocyanate, and an acid value of the polyurethane polymer is 40.0 mgKOH/g or more and 80.0 mgKOH/g or less.

13 Claims, No Drawings

INK JET INK, INK JET RECORDING METHOD, AND INK CARTRIDGE

BACKGROUND OF THE INVENTION

1. Field of the Invention

The present invention relates to an ink jet ink, and an ink jet recording method and an ink cartridge by using the above-described ink.

2. Description of the Related Art

In recent years, opportunities to use ink jet recording apparatuses in areas of business have increased as the image quality and recording speeds are improved. Examples of performance required of ink jet inks used in areas of business include the ink reliability (ejection stability and the like), the image quality (high image density, property of preventing feathering phenomenon, and the like), and the image fastness properties (scratch resistance, highlighter resistance, water resistance, and the like). In order to improve these performance characteristics, pigment inks containing various polyurethane polymers have been studied (PCT Japanese Translation Patent Publication No. 2005-515289 and Japanese Patent Laid-Open No. 2008-143960). PCT Japanese Translation Patent Publication No. 2005-515289 discloses polyurethane polymer dispersions having acid groups and aqueous ink jet inks containing self-dispersing pigments. Japanese Patent Laid-Open No. 2008-143960 discloses aqueous pigment inks containing polyurethane polymers formed from long-chain polyols containing carboxylic groups and siloxane compounds.

SUMMARY OF THE INVENTION

However, as a result of studies of the present inventors, it was found that the ink reliability and the image fastness properties of the pigment inks containing polyurethane polymers in the related art were improved, but did not satisfy the levels required in the areas of business in recent years. In particular, solution of the issues, e.g., the highlighter resistance and the scratch resistance, in the related art and realization of the ink ejection stability, the property of preventing feathering phenomenon, and the retained water resistance in the ink jet recording apparatus have not been achieved at the same time. According to aspects of the present invention, the retained water resistance does not refer to the water resistance generally evaluated through pouring of water, but refers to the water resistance under a severe condition in which water is allowed to retain on an image for a predetermined time.

According to the studies of the present inventors, it was found that in the case where the polyurethane polymer described in PCT Japanese Translation Patent Publication No. 2005-515289 was used, the acid value was low and about 20 to 30 mgKOH/g and, therefore, the ink ejection stability was insufficient. In the case where the polyurethane polymer described in Japanese Patent Laid-Open No. 2008-143960 was used, the acid value was a high 50 to 100 mgKOH/g and, therefore, the ejection stability was improved. However, a carboxyl group was included in a soft segment formed from a long chain polyol and the like and, thereby, a balance between the strength and the flexibility was lost, so that the scratch resistance of the image was insufficient. The soft segment will be described later. Regarding both PCT Japanese Translation Patent Publication No. 2005-515289 and Japanese Patent Laid-Open No. 2008-143960, the water resistance to running water was improved, but the retained water resistance under a severe condition in which water is allowed to retain on an image for a predetermined time was insufficient.

Accordingly, aspects of the present invention provide an ink jet ink, wherein issues, e.g., the highlighter resistance and the scratch resistance, are solved and, furthermore, compatibility of the ink ejection stability with the retained water resistance and the property of preventing feathering phenomenon of an image in the ink jet recording apparatus are ensured. Furthermore, aspects of the present invention provide an ink jet recording method and an ink cartridge by using the above-described ink according to aspects of the present invention.

An ink jet ink according to aspects of the present invention is an ink jet ink comprising a pigment and a polyurethane polymer, wherein the above-described polyurethane polymer has units derived from a polyol having no acid group and having the carbon number of 13 or more and 250 or less, a diol having an acid group and having the carbon number of 1 or more and 7 or less, a polyol having a siloxane structure, and a polyisocyanate, and the acid value of the above-described polyurethane polymer is 40.0 mgKOH/g or more and 80.0 mgKOH/g or less.

According to aspects of the present invention, an ink jet ink excellent in the ink ejection stability, the retained water resistance of an image, and the property of preventing feathering phenomenon in the ink jet recording apparatus can be provided. Furthermore, according to another embodiment of the present invention, an ink jet recording method and an ink cartridge by using the above-described ink can be provided.

Further features of the present invention will become apparent from the following description of exemplary embodiments.

DESCRIPTION OF THE EMBODIMENTS

The present invention will be described below in detail with reference to embodiments. An ink jet ink (hereafter referred to as an "ink") according to aspects of the present invention comprises a pigment and a polyurethane polymer which has units derived from a polyol having no acid group and having the carbon number of 13 or more and 250 or less, a diol having an acid group and having the carbon number of 1 or more and 7 or less, a polyol having a siloxane structure, and a polyisocyanate and which has an acid value of 40.0 mgKOH/g or more and 80.0 mgKOH/g or less. In order to provide an ink exhibiting a high level of scratch resistance and highlighter resistance of an image and excellent ink ejection stability, the present inventors studied on pigment inks containing various polyurethane polymers. As a result, it was found that the scratch resistance and the highlighter resistance of the image were improved by containing the polyurethane polymer in the ink, but the ink ejection stability was degraded. Then, for the purpose of improving the ink ejection stability, the acid value of the polyurethane polymer was increased to enhance the water solubility of the polyurethane polymer. As a result, the ink ejection stability was improved, but the scratch resistance and the highlighter resistance of the image were degraded. That is, it was found that there was a relationship of trade-off between the ink ejection stability and the scratch resistance or the highlighter resistance of the image. In addition, it was found that in the case where an ink containing a polyurethane polymer having high hydrophilicity was used, further problems, e.g., reduction in the retained water resistance and the property of preventing feathering phenomenon of the image, occurred. This is because if the hydrophilicity of the polyurethane polymer in the ink is high, the polyurethane polymer infiltrates and diffuses together with a liquid component in the ink into a recording medium easily and, thereby, edges of the image are blurred and a feathering phenomenon occurs. Moreover, regarding the recorded image, redispersion of the pigment due to absorption of water occurs easily, and the retained water resistance of the image is degraded. That is, there is also a relationship of trade-off between the ink ejection stability and the retained water resistance or the property of preventing feathering phenomenon of the image. In consideration of these results, in order to solve the highlighter resistance and the scratch resistance of the image and, furthermore, ensure the compatibility of the ink ejection stability with the retained water resistance and the property of preventing feathering phenomenon of the image, the present inventors studied on the polyurethane polymer contained in the ink, so that aspects of the present invention have been made. The details are as described below.

For the purpose of improving the ink ejection stability, it may be necessary to increase the acid value of the polyurethane polymer to enhance the hydrophilicity of the polyurethane polymer contained in the ink. In the case where a polyurethane polymer having an acid value of 40.0 mgKOH/g or more was used, the ink ejection stability was improved, as described above. However, the scratch resistance and the highlighter resistance of the image and, furthermore, the retained water resistance and the property of preventing feathering phenomenon of the image were degraded. Then, the present inventors studied on the structure of the polyurethane polymer in order that the polyurethane polymer having an acid value of 40.0 mgKOH/g or more improved the scratch resistance and the highlighter resistance of the image and, furthermore, the retained water resistance and the property of preventing feathering phenomenon of the image while keeping good ink ejection stability.

Initially, from the viewpoint of the scratch resistance and the highlighter resistance of the image and the ink ejection stability, the present inventors studied on an optimum position in the polyurethane polymer structure for bonding to an acid group. Then, two types of polyurethane polymers, which have the same acid value and in which the positions bonded to an acid group were different, and a polyurethane polymer A having no acid value and serving as a reference were synthesized and pigment inks, each containing one of the polyurethane polymers, were compared. As for the polyurethane polymers, in which the positions bonded to an acid group were different, in the first place, a polyurethane polymer B synthesized by using a polyol having an acid group and having the carbon number of 13 or more and 250 or less (hereafter "a polyol having the carbon number of 13 or more and 250 or less" is referred to as "a long-chain polyol") was used. In the second place, a polyurethane polymer C synthesized by using a long-chain polyol having no acid group and a diol having an acid group and having the carbon number of 1 or more and 7 or less (hereafter "a diol having the carbon number of 1 or more and 7 or less" is referred to as "a short-chain diol") was used. The polyurethane polymers B and C were specified to have the same acid value of 40.0 mgKOH/g. Table 1 shows the compositions of the three types of polyurethane polymers A to C.

TABLE 1

Composition of Polyurethane polymers A, B, and C

| | Polyisocyanate | Polyol, Diol | Acid value (mgKOH/g) |
|---|---|---|---|
| Polyurethane polymer A | isophorone diisocyanate | polypropylene glycol (long-chain polyol having no acid group) | — |
| Polyurethane polymer B | | carboxylic acid modified polycaprolactone diol (long-chain polyol having acid group) | 40 |
| Polyurethane polymer C | | polypropylene glycol (long-chain polyol having no acid group) dimethylol propionic acid (short-chain diol having acid group) | 40 |

The ink ejection stability of both the polyurethane polymers B and C were improved as compared with that of the polyurethane polymer A. However, it was found that the scratch resistance and the highlighter resistance of the image of the polyurethane polymer B were degraded significantly as compared with those of the polyurethane polymer C. Although the reasons for an occurrence of such a difference resulting from the difference in position of bonding to an acid group are not certain, the present inventors believe that the difference is derived from a micro phase separation structure peculiar to the polyurethane polymer. The structure of the polyurethane polymer includes mainly two segments, that is, a hard segment formed from a polyisocyanate, a short-chain diol, a chain extension agent, and the like and a soft segment formed from a long-chain polyol and the like. The hard segment contributes to the strength, and the soft segment contributes to the flexibility mainly. The two segments take on the micro phase separation structure and, thereby, the polyurethane polymer can exhibit high elasticity having the strength and the flexibility in combination. It is believed that the polyurethane polymer B had an acid group in the soft segment formed from a long-chain polyol and, thereby, the balance between the strength and the flexibility was lost. According to a finding obtained from the above-described studies, it was important that the position of bonding to an acid group was specified to be the short-chain diol serving as the hard segment. That is, in synthesis of the polyurethane polymer having an acid group, it may be necessary that both the long-chain polyol having no acid group and the short-chain diol having an acid group are used.

According to the above-described studies, it is necessary that the polyurethane polymer used according to aspects of the present invention have "units derived from a polyisocyanate, a long-chain polyol having no acid group, and a short-chain diol having an acid group". The long-chain polyol having no acid group gives the strength and the flexibility to the polyurethane polymer and, thereby, improvements in scratch resistance and highlighter resistance of the image can be achieved. In addition, an improvement in ink ejection stability can also be achieved by adjusting the amount of the short-chain diol having an acid group in such a way that the acid value of the resulting polyurethane polymer becomes 40.0 mgKOH/g or more. On the other hand, in the case where a polyurethane polymer synthesized by using a polyisocyanate and a long-chain polyol having an acid group is used, compatibility of the ink ejection stability with the scratch resistance and the highlighter resistance of the image are not ensured.

The present inventors studied over and over again in order to obtain an ink capable of further ensuring the compatibility between the retained water resistance and the property of preventing feathering phenomenon of the image besides good scratch resistance and highlighter resistance of the image and good ink ejection stability. As a result, it was found that inclusion of "a unit derived from a polyol having a siloxane structure" in the polyurethane polymer was further necessary. According to aspects of the present invention, the siloxane structure refers to a Si—O structure. It is known that a compound having a siloxane structure exhibits very high water repellency. The opposite properties of the water repellency and the hydrophilicity can coexist by incorporating this structure exhibiting high water repellency into the above-described polyurethane polymer having appropriate hydrophilicity. As a result, the compatibility of the ink ejection stability with the retained water resistance and the property of preventing feathering phenomenon of the image were able to be ensured, although this had not ever been achieved because these effects were in the relationship of trade-off. Although the reasons for the above-described result are not certain, the present inventors believe as described below.

In the ink, the polyurethane polymer is stably dispersed because of appropriate hydrophilicity. Therefore, the polymer is not accumulated in the vicinity of the ink ejection orifice easily, and the ink ejection stability is improved. Meanwhile, after image forming, the polyurethane polymer exhibiting high water repellency exists in the image and, thereby, the water repellency of the image in itself becomes high. Consequently, even in the case where water is allowed to retain on the image for a certain time, pigment is not redispersed easily, and the retained water resistance of the image is improved.

An image or a character recorded by an ink jet method is an aggregate of dots formed from ink droplets. The ink droplets are applied to a recording medium in such a way that individual dots formed from ink droplets become close to each other. Therefore, after the ink droplets come into contact with the recording medium, portions where individual dots are overlapped are generated through diffusion of the ink. Consequently, regarding edges of the image and the character, an ink overflowed through overlapping of dots runs into a non-recording portion along the mesh of cellulose fibers. Such an image is recognized as a feathering phenomenon. That is, in order to suppress an occurrence of feathering phenomenon, it is necessary to design an ink in such a way that overlapping portions of neighboring individual dots are minimized. The ink according to aspects of the present invention, dots formed from ink droplets exhibit high water repellency. Consequently, for example, even when an ink droplet B is applied to a position close to some dot A, the dot A repels the ink droplet B because of water repellency, so that the dot B formed from the ink droplet B is recorded in such a way as to reduce overlapping with the dot A. It is believed that at the edges of the image and the character, recording is performed likewise in such a way that overlapping of dots is reduced, the ink does not run into a non-recording portion easily, and as a result, the property of preventing feathering phenomenon is improved.

However, the above-described effects are obtained only by employing the polyurethane polymer including "units derived from a long-chain polyol having no acid group, a short-chain diol having an acid group, a polyol having a siloxane structure, and a polyisocyanate" used for the ink according to aspects of the present invention. That is, it was found that the effects were not obtained with respect to the polyurethane polymer including units derived from a long-chain polyol having an acid group, a polyol having a siloxane structure, and a polyisocyanate described in Japanese Patent Laid-Open No. 2008-143960. Although the reasons for an occurrence of such a difference because of the difference in unit, which is believed to not contribute to the water repellency, other than the siloxane structure unit constituting the polyurethane polymer are not certain, the present inventors believe that the difference is derived from a micro phase separation structure peculiar to the polyurethane polymer. Regarding the polyurethane polymer used for the ink according to aspects of the present invention, it is believed that the opposite two properties, the hydrophilicity and the water repellency, are functionally separated and exhibited because the acid group contributing to the hydrophilicity is present in the hard segment and the siloxane structure contributing to the water repellency is present in the soft segment. On the other hand, the polyurethane polymer described in Japanese Patent Laid-Open No. 2008-143960 has both the acid group and the siloxane structure in the soft segment. Therefore, the structure contributing to the hydrophilicity and the structure contributing to the water repellency are present close to each other. Consequently, the opposite two properties are not exhibited smoothly, and the compatibility of the ink ejection stability with the retained water resistance and the property of preventing feathering phenomenon of the image is not ensured. Furthermore, it is necessary that the acid value of the polyurethane polymer used for the ink according to aspects of the present invention is specified to be 40.0 mgKOH/g or more and 80.0 mgKOH/g or less. As described above, if the acid value is less than 40.0 mgKOH/g, the ejection stability is not obtained. Meanwhile, if the proportion of the short-chain diol having an acid group is increased to improve the hydrophilicity of the polyurethane polymer, the proportion of the unit derived from the polyol component having no acid group and the unit derived from the polyol having the siloxane structure in the polyurethane polymer are decreased relatively. At this time, if the acid value of the polyurethane polymer is more than 80.0 mgKOH/g, the hydrophilicity of the polyurethane polymer becomes high, and the water repellency of the image is reduced, so that the retained water resistance, the highlighter resistance, and the property of preventing feathering phenomenon of the image are not obtained sufficiently. It is estimated that the effects of aspects of the present invention can be achieved by synergistically exerting the effects of the individual configurations in a manner similar to the above-described mechanism.

Ink Jet Ink

Each of components constituting the ink jet ink according to aspects of the present invention will be described below.

Polyurethane Polymer

The polyurethane polymer used according to aspects of the present invention has units derived from a polyol having no acid group and having the carbon number of 13 or more and 250 or less, a diol having an acid group and having the carbon number of 1 or more and 7 or less, a polyol having a siloxane structure, and a polyisocyanate and, in addition, the acid value of the above-described polyurethane polymer is 40.0 mgKOH/g or more and 80.0 mgKOH/g or less. Each of units constituting the polyurethane polymer according to aspects of the present invention will be described below in detail.

Polyisocyanate

According to aspects of the present invention, the "polyisocyanate" refers to a compound having at least two isocyanate groups. Specific examples of polyisocyanates used in aspects of the present invention can include aliphatic polyisocyanates, alicyclic polyisocyanates, aromatic polyisocyanates, and araliphatic polyisocyanates. Examples of aliphatic polyisocyanates can include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of alicyclic polyisocyanates can include isophorone diisocyanate, hydrogenated xylylene diisocyanate, 4,4-dicyclohexylmethane diisocyanate, 1,4-cyclohexane diisocyanate, methylcyclohexylene diisocyanate, and 1,3-bis(isocyanate methyl)cyclohexane. Examples of aromatic polyisocyanates can include tolylene diisocyanate, 2,2-diphenylmethane diisocyanate, 2,4-diphenylmethane diisocyanate, 4,4-diphenylmethane diisocyanate, 4,4-dibenzyl diisocyanate, 1,5-naphthylene diisocyanate, xylylene diisocyanate, 1,3-phenylene diisocyanate, and 1,4-phenylene diisocyanate. Examples of araliphatic polyisocyanates can include dialkyldiphenylmethane diisocyanate, tetraalkyldiphenylmethane diisocyanate, and alpha, alpha, alpha, alpha-tetramethylxylylene diisocyanate. At least one type of these polyisocyanates can be used. According to aspects of the present invention, in particular, the alicyclic polyisocyanates can be used among the above-described polyisocyanates. Furthermore, among the alicyclic polyisocyanates, isophorone diisocyanate can be used.

Polyol Having No Acid Group and Having the Carbon Number of 13 or More and 250 or Less Examples of polyols having no acid group and having the carbon number of 13 or more and 250 or less, used in aspects of the present invention, include polyether polyol, polyester polyol, polycarbonate diol, and other polyols having no acid group (for example, polyhydroxy polyacetal, polyhydroxy polyacrylate, polyhydroxy polyester amide, and polyhydroxy polythioether). At least one type of these polyols can be used. The carbon number of the polyol having no acid group, used in aspects of the present invention, is 13 or more and 250 or less. In the case where the carbon number is 13 or more and 250 or less, the flexibility of the film becomes appropriate, and effects of improving the scratch resistance and the highlighter resistance of the image are obtained sufficiently. The number average molecular weight (Mn), in terms of polystyrene, obtained by gel permeation chromatography (GPC) of the above-described polyol having no acid group may be 400 or more and 4,000 or less. If the number average molecular weight is less than 400, the film becomes rigid and the flexibility is reduced, so that the effects of improving the scratch resistance and the highlighter resistance of the image are not obtained sufficiently in some cases. If the number average molecular weight is more than 4,000, the flexibility of the film becomes too high, and effects of improving the scratch resistance and the highlighter resistance of the image are not obtained sufficiently in some cases. Moreover, the number of hydroxyl groups present in one molecule of polyol having no acid group and having the carbon number of 13 or more and 250 or less, used in aspects of the present invention, may be 2 or 3. Examples of polyether polyols include addition polymers of alkylene oxide and polyalkylene glycol or polyhydric alcohols having at least divalence. Examples of the above-described alkylene oxides can include ethylene oxide, propylene oxide, butylene oxide, and alpha-olefin oxide. Examples of the above-described polyalkylene glycols include polyethylene glycol, polypropylene glycol, polytetramethylene glycol, and ethylene glycol-propylene glycol copolymers. Examples of the above-described dihydric alcohols include hexamethylene glycol, tetramethylene glycol, ethylene glycol, diethylene glycol, propylene glycol, dipropylene glycol, 1,3-butane diol, 1,4-butane diol, 4,4-dihydroxyphenylpropane, and 4,4-dihydroxyphenylmethane. Examples of polyhydric alcohols having at least trivalence include glycerin, trimethylolpropane, 1,2,5-hexane triol, 1,2,6-hexane triol, and pentaerithritol. At least one type of these polyether polyols can be used.

Examples of polyester polyols include esters of acid components and polyalkylene glycols or polyhydric alcohols having at least divalence. Examples of acid components constituting the polyester polyol include aromatic carboxylic acids, alicyclic carboxylic acids, and aliphatic carboxylic acids. Examples of the above-described aromatic carboxylic acids include isophthalic acid, terephthalic acid, orthophthalic acid, 1,4-naphthalene dicarboxylic acid, 2,5-naphthalene dicarboxylic acid, 2,6-naphthalene dicarboxylic acid, biphenyl dicarboxylic acid, and tetrahydrophthalic acid. Examples of the above-described alicyclic carboxylic acids include hydrogen adducts of the above-described aromatic carboxylic acids. Examples of the above-described aliphatic carboxylic acids include malonic acid, succinic acid, tartaric acid, oxalic acid, glutaric acid, adipic acid, pimelic acid, suberic acid, azelaic acid, sebacic acid, alkyl succinic acid, linolenic acid, maleic acid, fumaric acid, mesaconic acid, citraconic acid, and itaconic acid. Reactive derivatives, e.g., anhydrides, alkyl esters, and halides of these acid components can also be used as acid components constituting polyester polyols. At least one type of the above-described acid components constituting polyester polyols can be used. Examples of polyalkylene glycols or polyhydric alcohols having at least divalence to react with the above-described acid components include those mentioned as examples of polyether polyols. At least one type of polyester polyols can be used.

As for polycarbonate diols, besides diols including 1,6-hexane diol as a basic structure, polycarbonate diols produced by methods in the related art can be used. Examples thereof include polycarbonate diols obtained by reacting carbonate components, e.g., alkylene carbonates, diaryl carbonates, and dialkyl carbonates, or phosgene with aliphatic diol components. At least one type of these polycarbonate diols can be used.

According to aspects of the present invention, among the above-described polyols, in particular, polyether polyols can be used. In the case where the polyether polyol is used, the flexibility of the polyurethane polymer can be exhibited appropriately, so that the scratch resistance and the highlighter resistance of the image are further improved. Among polyether polyols, in particular, polypropylene glycol can be used. According to the studies of the present inventors, it was ascertained that the water solubility of the polyurethane polymer was improved and the ink ejection stability was further improved by using polypropylene glycol.

Diol Having an Acid Group and Having the Carbon Number of 1 or More and 7 or Less According to aspects of the present invention, the "diol having an acid group and having the carbon number of 1 or more and 7 or less" refers to a diol having an acid group, e.g., a carboxyl group, a sulfonic acid group, or a phosphoric acid group, in the molecule and having the carbon number of 1 or more and 7 or less. In the case where the carbon number of the diol having an acid group is 8 or more, the resulting polyurethane polymer easily takes on a structure having an acid group in a soft segment, the balance between the strength and the flexibility is lost, and the scratch resistance and the highlighter resistance are not obtained sufficiently. Examples of diols having an acid group, used in aspects of the present invention, include compounds represented by General formula (1) and General formula (2) described below:

General formula (1)

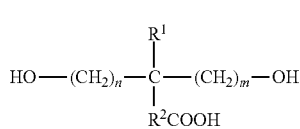

General formula (3)

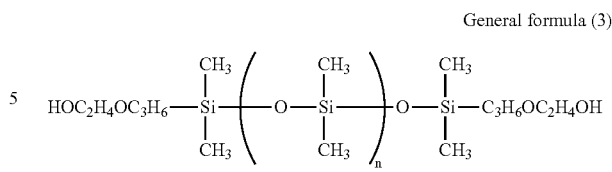

in General formula (1), $R^1$ represents a hydrogen atom, a methyl group, or an ethyl group, $R^2$ represents an alkylene group having the carbon number of 1 to 3, n represents 1 to 3, and m represents 1 to 3, in General formula (3), n represents 4 or more and 60 or less, General formula (2)

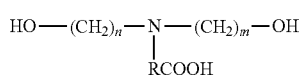

General formula (4)

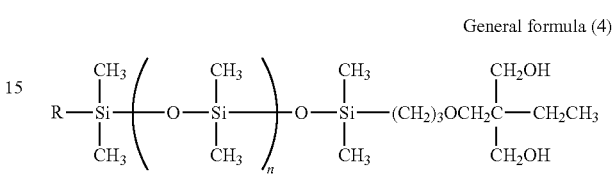

in General formula (2), R represents an alkylene group having the carbon number of 1 to 4, n represents 1 to 4, and m represents 1 to 4.

Further specifically, examples of compounds represented by General formula (1) include dimethylol acetic acid, dimethylol propionic acid, and dimethylol butanoic acid, and examples of compounds represented by General formula (2) include N,N-di(2-hydroxyethyl)glycine and N,N-di(2-hydroxyethyl)alanine. In particular, at least one type selected from dimethylol propionic acid, dimethylol butanoic acid, and N,N-di(2-hydroxyethyl)glycine can be used. The acid value of the polyurethane polymer can be adjusted by the proportion of the diol having an acid group and having the carbon number of 1 or more and 7 or less.

Polyol Having Siloxane Structure

According to aspects of the present invention, the term "have a siloxane structure" refers to have a Si—O structure. Examples of polyols having a siloxane structure used in aspects of the present invention include organic compounds in which two hydroxyl groups are bonded to a polysiloxane having a repeated structure represented by Formula (I):

Formula (I)

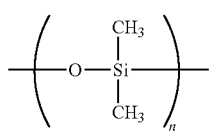

in Formula (I), n represents 4 or more and 60 or less.

If n is less than 4, in some cases, the water repellency is not exhibited sufficiently and the effects of improving the retained water resistance and the property of preventing feathering phenomenon are not obtained sufficiently. If n is more than 60, in some cases, the water repellency becomes too high, appropriate hydrophilicity is not obtained, and the effect of improving the ejection stability is not obtained sufficiently.

More specifically, examples of polyols having a siloxane structure used in aspects of the present invention include polyols having hydroxyl groups at both ends of the main chain of siloxane, as shown by General formula (3) described below, and polyols having a hydroxyl group at one end of the main chain of siloxane, as shown by General formula (4) described below:

in General formula (4), R represents a hydrogen atom or an alkyl group having the carbon number of 1 to 120, and n represents 4 or more and 60 or less.

The number average molecular weights (Mn), in terms of polystyrene, obtained by gel permeation chromatography (GPC) of the compounds represented by General formulae (3) and (4) may be 1,000 or more and 5,000 or less. Examples of commercially available polyols which are represented by General formula (3) described above and which have a siloxane structure include SILAPLANE FM-4411, FM-4421, and FM-4425 produced by Chisso Corporation and X-22-160AS, KF-6001, KF-6002, and KF-6003 produced by Shin-Etsu Chemical Co., Ltd. Examples of commercially available polyols which are represented by General formula (4) described above and which have a siloxane structure include SILAPLANE FM-DA11, FM-DA21, and FM-DA26 produced by Chisso Corporation and X-22-176DX and X-22-176F produced by Shin-Etsu Chemical Co., Ltd.

According to aspects of the present invention, the proportion of the unit derived from the polyol having a siloxane structure in the polyurethane polymer may be 0.5 percent by mass or more and 5.0 percent by mass or less. If the proportion is less than 0.5 percent by mass, in some cases, the effects of improving the retained water resistance and the property of preventing feathering phenomenon are not obtained sufficiently. If the proportion is more than 5.0 percent by mass, in some cases, the water repellency is enhanced and the ejection stability is not obtained sufficiently.

The mass ratio of the proportion (percent by mass) of the unit derived from the polyol having no acid group and having the carbon number of 13 or more and 250 or less in the polyurethane polymer to the proportion (percent by mass) of the unit derived from the polyol having a siloxane structure may be 0.80 times or more and 20.00 times or less. If the ratio is less than 0.80 times, the ejection stability is not obtained sufficiently in some cases because appropriate hydrophilicity is not obtained and the water repellency is enhanced. If the ratio is more than 20.00 times, in some cases, the flexibility of the polyurethane polymer becomes too high and the scratch resistance and the highlighter resistance are not obtained sufficiently. In this regard, the proportion of each unit in the polyurethane polymer is on the basis of the total mass of the polyurethane polymer.

Chain Extension Agent

The chain extension agent is a compound to react with remaining isocyanate group, which has not formed an urethane bond, among polyisocyanate units in an urethane prepolymer. Examples of chain extension agents usable in synthesis of the polyurethane polymer used for the ink according to aspects of the present invention include trimethylolmelamine and derivatives thereof, dimethylolurea and derivatives thereof, polyvalent amine compounds, e.g., dimethylol ethylamine, diethanol methylamine, dipropanol ethylamine, dibutanol methylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, polyamide polyamine, and polyethylene polyimine. At least one type of these chain extension agents can be used. According to aspects of the present invention, the chain extension agent can be selected from diamine compounds in order to obtain more favorable ejection stability. This is because appropriate molecular weight control and provision of hydrophilicity are performed on the basis of the bond by the diamine compound.

The polyurethane polymer used for the ink according to aspects of the present invention has the above-described four types of units and may have different units insofar as the other requirements are satisfied and the effects of aspects of the present invention are obtained.

The weight average molecular weight (Mw), in terms of polystyrene, obtained by gel permeation chromatography (GPC) of the polyurethane polymer used for the ink according to aspects of the present invention may be 10,000 or more and 60,000 or less.

According to aspects of the present invention, the content (percent by mass) of the polyurethane polymer in the ink may be less than 2.0 percent by mass relative to the total mass of the ink, such as 0.1 percent by mass or more and less than 2.0 percent by mass. If the content is less than 0.1 percent by mass, in some cases, the effects of improving the scratch resistance and the highlighter resistance of the image are small. If the content is 2.0 percent by mass or more, in some cases, the ink ejection stability is not obtained sufficiently. The ink may further contain polymers other than the above-described polyurethane polymer within the bounds of not impairing the effects according to aspects of the present invention. The mass ratio of the content (percent by mass) of the polyurethane polymer to the content (percent by mass) of the pigment relative to the total mass of the ink may be 0.1 times or more and 1.0 time or less. If the above-described mass ratio is less than 0.1 times, in some cases, the effects of improving the retained water resistance and the property of preventing feathering phenomenon of the image are not sufficient. If the above-described mass ratio is more than 1.0 time, in some cases, the effect of improving the ink ejection stability is not sufficient.

Synthesis Method and Analysis Method of Polyurethane Polymer

As for the method for synthesizing the polyurethane polymer used for the ink according to aspects of the present invention, any method generally used in the related art, e.g., a one-shot method and a multistage method, can be used. The composition, the molecular weight, and the acid value of the polyurethane polymer can be analyzed by a method in the related art. That is, it is possible to ascertain by subjecting the ink to centrifugal separation and examining the resulting sediments and a supernatant fluid. The pigment is insoluble into common organic solvents and, therefore, the polyurethane polymer can be separated through solvent extraction. Although it is possible to ascertain individually in the state of ink, higher accuracy is ensured through extraction of the polyurethane polymer. As for a specific method, the ink is subjected to centrifugal separation at 80,000 rpm, and the resulting supernatant fluid is subjected to acid precipitation with hydrochloric acid or the like. Then, dried product of acid precipitation is analyzed by using a pyrolysis gas chromatography/mass spectrometer (pyrolysis GC/MS) and, thereby, the types of compounds constituting the polyurethane polymer can be identified. The dried product of acid precipitation is dissolved into chloroform or the like and is measured by a nuclear magnetic resonance method (NMR), so that the types and molecular weights of the polyol having no acid group, the diol having an acid group, and the polyol having a siloxane structure and the proportions of units derived therefrom can be determined quantitatively. The dried product of acid precipitation is dissolved into tetrahydrofuran (THF) and the acid value can be measured through potentiometric titration by using a potassium hydroxide ethanol titrant. The Si concentration of the supernatant fluid is measured by ICP emission spectroscopy and, thereby, the proportion of the unit derived from the polyol having a siloxane structure in the polyurethane polymer can be determined. The average molecular weight of the polyurethane polymer is obtained by gel permeation chromatography (GPC). According to aspects of the present invention, the condition of GPC is as described below.

Apparatus: Alliance GPC 2695 (produced by Waters)
  Column: four gang column of Shodex KF-806M (produced by SHOWA DENKO K.K.)
  Mobile phase: THF (analytical grade)
  Flow rate: 1.0 mL/min
  Oven temperature: 40.0° C.
  Amount of injection of sample solution: 0.1 mL
  Detector: RI (refractive index)
  Polystyrene standard sample: PS-1 and PS-2 (produced by Polymer Laboratories) (molecular weight: 17 types of 7,500,000, 2,560,000, 841,700, 377,400, 320,000, 210,500, 148,000, 96,000, 59,500, 50,400, 28,500, 20,650, 10,850, 5,460, 2,930, 1,300, and 580)

Pigment

Examples of pigments used for the ink according to aspects of the present invention include polymer dispersion type pigments by using polymers as dispersing agents (a polymer-dispersing pigment by using a macromolecular dispersing agent, a microcapsule pigment in which the surfaces of pigment particles are covered with a polymer, and a polymer-attached self-dispersing pigment in which an organic group containing a high molecule is chemically attached to the surface of a pigment particle) and self dispersion type pigments in which a hydrophilic group is attached to the surfaces of pigment particles (a self-dispersing pigment). As a matter of course, pigments prepared by different dispersing methods can be used in combination.

Examples of pigments usable for the ink according to aspects of the present invention include inorganic pigments, e.g., carbon black, and organic pigment, and any pigment usable for the ink jet ink in the related art can be used. The content (percent by mass) of the pigment in the ink may be 0.1 percent by mass or more and 15.0 percent by mass or less, such as 1.0 percent by mass or more and 10.0 percent by mass or less relative to the total mass of the ink. If the content is less than 1.0 percent by mass, in some cases, the image density is not obtained sufficiently. If the content is more than 15.0 percent by mass, in some cases, ink jet characteristics, e.g., adhesion resistance, is not obtained sufficiently.

Aqueous Medium

An aqueous medium, which is water or a mixed solvent of water and a water-soluble organic solvent, can be used for the ink according to aspects of the present invention. The content (percent by mass) of the water-soluble organic solvent in the ink may be 3.0 percent by mass or more and 50.0 percent by mass or less relative to the total mass of the ink. Any water-soluble organic solvent commonly used for the ink jet ink in the related art can be used. Examples thereof include alkyl alcohols having the carbon number of 1 to 4, amides, ketones, keto-alcohols, ethers, polyalkylene glycols, glycols, alkylene glycols in which an alkylene group has the carbon number of 2 to 6, polyhydric alcohols, alkyl ether acetates, alkyl ethers of polyhydric alcohols, nitrogen-containing compounds, and sulfur-containing compounds. At least one type of these water-soluble organic solvents can be used. Deionized water (ion-exchanged water) can be used as the water. The content (percent by mass) of the water in the ink may be 50.0 percent by mass or more and 95.0 percent by mass or less relative to the total mass of the ink. The viscosity of the ink at 25° C. may be 5 cps or less and can be adjusted by, for example, the configuration and the content of the aqueous medium. If the viscosity of the ink at 25° C. is more than 5 cps, in some cases, the effect of improving the ink ejection stability is not obtained sufficiently.

The ink according to aspects of the present invention can contain polyethylene glycol serving as the water-soluble organic solvent and having the number average molecular weight (Mn), in terms of polystyrene, obtained by gel permeation chromatography (GPC) of 400 or more and 2,000 or less. This is because the polyethylene glycol having a number average molecular weight of 400 or more and 2,000 or less has high affinity with the unit derived from the polyol having no acid group in the polyurethane polymer structure. Consequently, in the case where the polyethylene glycol having a number average molecular weight of 400 or more and 2,000 or less is contained in the ink, the recorded image can be formed uniformly and the retained water resistance and the property of preventing feathering phenomenon of the image are more improved. Specifically, Polyethylene glycol 1000 (number average molecular weight 1,000) is mentioned.

Other Additives

The ink according to aspects of the present invention may contain water-soluble organic compounds, which are solid at ambient temperature and which are, for example, polyhydric alcohols, e.g., trimethylolpropane and trimethylolethane, urea, and urea derivatives, e.g., ethyleneurea, besides the above-described components. The ink according to aspects of the present invention may contain various additives, e.g., polymers other than the above-described polyurethane polymer, a surfactant, a pH regulator, a rust inhibitor, an antiseptic, a fungicide, an antioxidant, a reduction inhibitor, a vaporization promoter, and a chelating agent. In the case where the ink further contains polymers other than the polyurethane polymer, the total content of all polymers in the ink may be 0.01 percent by mass or more and 10.0 percent by mass or less relative to the total mass of the ink.

Ink Cartridge

The ink cartridge according to aspects of the present invention includes an ink storage portion to store an ink, wherein the above-described ink according to aspects of the present invention is stored in the above-described ink storage portion. As for the structure of the ink cartridge, a structure in which the ink storage portion is formed from an ink containing chamber to store the liquid ink and a negative pressure generation member-holding chamber to store a negative pressure generating member to hold the ink in the inside thereof through the use of a negative pressure is mentioned. Alternatively, the ink cartridge may be an ink storage portion which does not have the ink containing chamber to store the liquid ink, but which is configured to hold the whole ink to be stored by the negative pressure generating member. Furthermore, a form in which the ink cartridge is configured to have the ink storage portion and a recording head may be employed.

Ink Jet Recording Method

An ink-jet recording method according to aspects of the present invention is the ink jet recording method to perform recording on a recording medium by ejecting an ink from an ejection port of an ink-jet method recording head in accordance with recording signals, and the above-described ink according to aspects of the present invention is used. At this time, an image can be formed by using a plurality of inks satisfying the configuration according to aspects of the present invention in combination. However, an image may be formed by using the ink satisfying the configuration according to aspects of the present invention and an ink not satisfying the configuration according to aspects of the present invention in combination. This is because the effects according to aspects of the present invention can be achieved if the polyurethane polymer in the ink, which has high water repellency and a high fastness property, according to aspects of the present invention is present in the image even in small amounts. Regarding aspects of the present invention, in particular, the ink jet recoding method employing the system in which thermal energy is applied to the ink so as to eject the ink from the ejection port of the recording head can be used. According to aspects of the present invention, the term "recording" includes the form in which recording is performed on normal paper or a recording medium having an ink receiving layer by using the ink according to aspects of the present invention, and a form in which printing is performed on a base member, e.g., glass, plastic, and film, not having a liquid absorption property by using the ink according to aspects of the present invention.

EXAMPLES

The present invention will be described below in further detail with reference to examples and comparative examples. However, the present invention is not limited to the following examples within the bounds of not departing from the gist thereof. By the way, in the following description of the examples, the term "part" is on a mass basis, unless otherwise specified.

Preparation of Polyurethane Polymer Dispersion

Preparation of Polyurethane polymer dispersions PU-1 to PU-36

In methyl ethyl ketone, a polyol having no acid group (B part) and a polyol having a siloxane structure (C part) were agitated and dissolved sufficiently. A polyisocyanate (A part) and a diol having an acid group (D part) were added and reaction was effected at 75° C. for 1 hour, so as to obtain an urethane prepolymer solution. The resulting urethane prepolymer solution was cooled to 60° C., and potassium hydroxide aqueous solution was added to neutralize the acid group. Thereafter, cooling to 40° C. was performed, ion-exchanged water was added, and high-speed agitation was performed with a homomixer to effect emulsification. After the emulsification, a chain extension agent (E part) was added, and a chain extension reaction was effected at 30° C. for 12 hours. When the presence of an isocyanate group became not detected with FT-IR, methyl ethyl ketone was removed by distillation while the polymer solution was heated and decompressed, so that Polyurethane polymer dispersions PU-1 to PU-36, in which the polyurethane polymer was dispersed in water, were obtained. The content of the polyurethane polymer in the resulting polyurethane polymer dispersion was 20.0 percent by mass. The acid value of the resulting polyurethane polymer was measured through potentiometric titration with Automatic Potentiometric Titrator AT510 (produced by Kyoto Electronics Manufacturing Co., Ltd.) by using the above-described potassium hydroxide methanol titrant. The weight average molecular weight (Mw), in terms of polystyrene, obtained by gel permeation chromatography (GPC) of the polyurethane polymer was measured as described below. A THF solution of the polyurethane polymer (polymer content was 0.1 percent by mass) was prepared and filtrated with a solvent-resistant membrane filter having a pore size of 0.45 μm (trade name: TITAN2 Syringe Filter, PTFE, 0.45 μm; produced by SUN-SRi), so as to prepare a sample solution. The resulting sample solution was used, and the weight average molecular weight was measured under the following condition.

Apparatus: Alliance GPC 2695 (produced by Waters)
Column: four gang column of Shodex KF-806M (produced by SHOWA DENKO K.K.)
Mobile phase: THF (analytical grade)
Flow rate: 1.0 mL/min
Oven temperature: 40.0° C.
Amount of injection of sample solution: 0.1 mL
Detector: RI (refractive index)
Polystyrene standard sample: PS-1 and PS-2 (produced by Polymer Laboratories) (molecular weight: 17 types of 7,500,000, 2,560,000, 841, 700, 377, 400, 320,000, 210, 500, 148,000, 96,000, 59,500, 50,400, 28,500, 20,650, 10,850, 5,460, 2,930, 1,300, and 580)

Furthermore, the content of the component derived from the polyol having a siloxane structure in a polyurethane polymer chain was measured by an NMR method, as described above. The preparation condition and characteristics of each polyurethane polymer dispersion are shown in Table 2. In this regard, the number average molecular weight (Mn) of the polyol having no acid group and having the carbon number of 13 or more and 250 or less is shown in Table 2. The measurement condition of this number average molecular weight (Mn) is the same as that of the above-described weight average molecular weight (Mw).

TABLE 2

Preparation condition and characteristics of polyurethane polymer (PU polymer) dispersion

| PU-No. | Polyisocyanate Type | A (part) | Polyol having no acid group and having the carbon number of 13 or more and 250 or less Type | Mn | B (part) | Polyol having siloxane (SiO) structure Type | C (part) | Diol having acid group and having the carbon number of 1 or more and 7 or less Type | D (part) | Chain extension agent Type | E (part) | Proportion of unit derived from polyol having SiO structure in PU polymer (percent by mass) | Content of unit derived from polyol having no acid group and having the carbon number of 13 or more and 250 or less/content of unit derived from polyol having SiO structure | Mw of PU polymer (×1000) | Acid value of PU polymer (mgKOH/g) |
|---|---|---|---|---|---|---|---|---|---|---|---|---|---|---|---|
| PU-1 | IPDI | 31.8 | PPG | 2000 | 54.6 | FM4411 | 1.50 | DMPA | 12.1 | EDA | 1.43 | 1.5 | 2.75 | 30.0 | 50.0 |
| PU-2 | IPDI | 20.9 | PPG | 2000 | 72.6 | FM4411 | 1.50 | DMPA | 5.5 | EDA | 0.95 | 1.5 | 2.07 | 21.8 | 22.5 |
| PU-3 | IPDI | 25.3 | PPG | 2000 | 64.9 | FM4411 | 1.50 | DMPA | 8.3 | EDA | 1.17 | 1.5 | 2.31 | 23.5 | 35.0 |
| PU-4 | IPDI | 27.2 | PPG | 2000 | 61.8 | FM4411 | 1.50 | DMPA | 9.5 | EDA | 1.26 | 1.5 | 2.43 | 28.3 | 40.0 |
| PU-5 | IPDI | 42.9 | PPG | 2000 | 36.5 | FM4411 | 1.50 | DMPA | 19.1 | EDA | 1.97 | 1.5 | 4.11 | 32.5 | 80.0 |
| PU-6 | IPDI | 44.7 | PPG | 2000 | 33.5 | FM4411 | 1.50 | DMPA | 20.3 | EDA | 2.06 | 1.5 | 4.48 | 35.0 | 85.0 |
| PU-7 | IPDI | 46.8 | PPG | 2000 | 30.3 | FM4411 | 1.50 | DMPA | 21.4 | EDA | 2.15 | 1.5 | 4.95 | 36.2 | 90.2 |
| PU-8 | IPDI | 53.7 | PPG | 300 | 33.0 | FM4411 | 1.50 | DMPA | 12.0 | EDA | 2.47 | 1.5 | 4.55 | 37.0 | 50.0 |
| PU-9 | IPDI | 48.9 | PPG | 400 | 37.6 | FM4411 | 1.50 | DMPA | 12.0 | EDA | 2.27 | 1.5 | 3.99 | 30.0 | 50.0 |
| PU-10 | IPDI | 27.8 | PPG | 4000 | 58.8 | FM4411 | 1.50 | DMPA | 11.9 | EDA | 1.27 | 1.5 | 2.55 | 28.4 | 50.0 |
| PU-11 | IPDI | 27.4 | PPG | 5000 | 59.1 | FM4411 | 1.50 | DMPA | 11.9 | EDA | 1.24 | 1.5 | 2.54 | 28.0 | 50.0 |
| PU-12 | IPDI | 40.0 | PPG | 2000 | 42.0 | FM4411 | 0.35 | DMPA | 17.6 | EDA | 1.65 | 0.4 | 0.83 | 31.2 | 73.7 |
| PU-13 | IPDI | 40.0 | PPG | 2000 | 42.0 | FM4411 | 0.40 | DMPA | 17.6 | EDA | 1.65 | 0.4 | 0.95 | 31.3 | 73.7 |
| PU-14 | IPDI | 31.2 | PPG | 2000 | 56.4 | FM4411 | 0.50 | DMPA | 12.0 | EDA | 1.43 | 0.5 | 0.89 | 30.0 | 50.0 |
| PU-15 | IPDI | 32.0 | PPG | 2000 | 51.1 | FM4411 | 5.00 | DMPA | 12.0 | EDA | 1.43 | 5.0 | 9.79 | 30.0 | 50.0 |
| PU-16 | IPDI | 32.0 | PPG | 2000 | 50.7 | FM4411 | 5.40 | DMPA | 11.9 | EDA | 1.43 | 5.4 | 10.65 | 30.0 | 50.0 |
| PU-17 | IPDI | 32.0 | PPG | 2000 | 49.6 | FM4411 | 6.50 | DMPA | 12.0 | EDA | 1.43 | 6.5 | 13.12 | 30.0 | 50.0 |
| PU-18 | IPDI | 25.5 | PPG | 2000 | 64.3 | FM4411 | 0.50 | DMPA | 9.7 | EDA | 0.57 | 0.5 | 0.78 | 16.2 | 40.6 |
| PU-19 | IPDI | 29.3 | PPG | 2000 | 60.0 | FM4411 | 0.50 | DMPA | 10.2 | EDA | 1.53 | 0.5 | 0.83 | 30.5 | 50.0 |
| PU-20 | IPDI | 44.0 | PPG | 2000 | 40.1 | FM4411 | 4.05 | DMPA | 11.9 | EDA | 1.43 | 4.1 | 10.20 | 30.0 | 42.7 |
| PU-21 | IPDI | 53.0 | PPG | 2000 | 25.0 | FM4411 | 4.90 | DMPA | 17.1 | EDA | 5.58 | 4.9 | 19.60 | 45.0 | 71.6 |
| PU-22 | IPDI | 55.0 | PPG | 2000 | 22.0 | FM4411 | 5.00 | DMPA | 18.0 | EDA | 5.79 | 5.0 | 22.73 | 46.1 | 75.4 |
| PU-23 | TDI | 25.1 | PPG | 2000 | 61.4 | FM4411 | 1.51 | DMPA | 12.1 | EDA | 1.43 | 1.5 | 2.46 | 30.6 | 50.0 |
| PU-24 | IPDI | 31.8 | PES | 2000 | 54.6 | FM4411 | 1.50 | DMPA | 12.1 | EDA | 1.43 | 1.5 | 2.75 | 30.0 | 50.0 |
| PU-25 | IPDI | 31.8 | PC | 2000 | 54.6 | FM4411 | 1.50 | DMPA | 12.1 | EDA | 1.43 | 1.5 | 2.75 | 30.0 | 50.0 |
| PU-26 | IPDI | 31.8 | PTMG | 2000 | 54.6 | FM4411 | 1.50 | DMPA | 12.1 | EDA | 1.43 | 1.5 | 2.75 | 30.0 | 50.0 |
| PU-27 | IPDI | 31.2 | PPG | 2000 | 55.3 | FM4421 | 1.50 | DMPA | 12.0 | EDA | 1.43 | 1.5 | 2.71 | 30.0 | 50.0 |
| PU-28 | IPDI | 31.8 | PPG | 2000 | 54.6 | FM4411 | 1.50 | FMDA11 | 12.1 | EDA | 1.43 | 1.5 | 2.75 | 30.0 | 50.0 |
| PU-29 | IPDI | 31.8 | PPG | 2000 | 54.2 | FM4411 | 1.50 | DMBA | 13.2 | EDA | 1.43 | 1.5 | 2.77 | 29.9 | 50.0 |
| PU-30 | IPDI | 31.2 | PPG | 2000 | 52.7 | FM4411 | 1.50 | Bicine | 14.6 | EDA | 1.43 | 1.5 | 2.85 | 30.3 | 50.0 |
| PU-31 | IPDI | 31.8 | PPG | 2000 | 54.6 | FM4411 | 1.50 | DMPA | 12.1 | DETA | 1.64 | 1.5 | 2.75 | 33.1 | 50.0 |
| PU-32 | IPDI | 53.9 | PPG | 300 | 33.6 | FM4411 | 0.40 | DMPA | 12.1 | EDA | 1.43 | 0.4 | 1.19 | 30.0 | 50.0 |
| PU-33 | IPDI | 20.8 | PPG | 2000 | 73.7 | — | 0 | DMPA | 5.5 | EDA | 1.43 | — | — | 30.1 | 23.0 |
| PU-34 | IPDI | 31.2 | PPG | 2000 | 56.9 | — | 0 | DMPA | 11.9 | EDA | 1.43 | — | — | 30.0 | 50.0 |

TABLE 2-continued

Preparation condition and characteristics of polyurethane polymer (PU polymer) dispersion

| | | Polyol having no acid group and having the carbon number of 13 or more and 250 or less | | | Polyol having siloxane (SiO) structure | | Diol having acid group and having the carbon number of 1 or more and 7 or less | | Chain extension agent | | Proportion of unit derived from polyol having SiO structure in PU polymer | Content of unit derived from polyol having no acid group and having the carbon number of 13 or more and 250 or less/ content of unit derived from polyol having SiO structure | Mw of PU polymer (×1000) | Acid value of PU polymer (mgKOH/g) |
|---|---|---|---|---|---|---|---|---|---|---|---|---|---|---|
| PU-No. | Polyisocyanate Type | A (part) | Type | Mn | B (part) | Type | C (part) | Type | D (part) | Type | E (part) | (percent by mass) | | | |
| PU-35 | IPDI | 12.0 | PPG | 2000 | 86.5 | FM4411 | 1.50 | — | 0 | EDA | 0.56 | 1.5 | 1.73 | 18.9 | 0 |
| PU-36 | IPDI | 37.6 | — | — | 0 | FM4411 | 50.3 | DMPA | 12.1 | EDA | 14.3 | 50.3 | 0 | 10.1 | 50.7 |

IPDI: Isophorone diisocyanate
TDI: Tolylene diisocyanate
PPG: Polypropylene glycol
PES: Phthalic acid based polyester polyol (number average molecular weight: 2000)
PC: Hexane diol based polycarbonate diol (number average molecular weight: 2000)
PTMG: Polytetramethylene glycol
DMPA: Dimethylol propionic acid
DMBA: Dimethylol butanoic acid
Bicine: N,N-bis(2-hydroxyethyl)glycine
EDA: Ethylenediamine
DETA: Diethylenetriamine
FM4411: SILAPLANE FM-4411 (polyol having siloxane bond represented by General formula (3), number average molecular weight: 1000)
FM4421: SILAPLANE FM-4421 (polyol having siloxane bond represented by General formula (3), number average molecular weight: 5000)
FMDA11: SILAPLANE FM-DA11 (polyol having siloxane bond represented by General formula (4), number average molecular weight: 1000)

Preparation of Polyurethane Polymer Dispersion PU-37

In methyl ethyl ketone, a polyol having a siloxane structure (SILAPLANE FM-4411 (number average molecular weight was 1,000); produced by Chisso Corporation) (1.50 parts) was agitated and dissolved sufficiently. Isophorone diisocyanate (53.8 parts) and carboxylic acid modified polycaprolactone diol (PLACCEL 205BA (number average molecular weight was 500); produced by DAICEL CHEMICAL INDUSTRIES, LTD.) (44.7 parts) were added and reaction was effected at 75° C. for 1 hour, so as to obtain an urethane prepolymer solution. The resulting urethane prepolymer solution was cooled to 60° C., and potassium hydroxide aqueous solution was added to neutralize the acid group. Thereafter, cooling to 40° C. was performed, ion-exchanged water was added, and high-speed agitation was performed with a homomixer to effect emulsification. After the emulsification, ethylenediamine (1.43 parts) was added, and a chain extension reaction was effected at 30° C. for 12 hours. When the presence of an isocyanate group became not detected with FT-IR, methyl ethyl ketone was removed by distillation while the polymer solution was heated and decompressed, so that Polyurethane polymer dispersion PU-37, in which the polyurethane polymer was dispersed in water, (the content of the polyurethane polymer was 20.0 percent by mass) was obtained. The weight average molecular weight (Mw) of the resulting polyurethane polymer was 30,000 and the acid value was 50.0 mgKOH/g. The proportion (percent by mass) of the unit derived from the polyol having a siloxane structure in the polyurethane polymer was 1.5 percent by mass.

Preparation of Polyurethane Polymer Dispersion PU-38

In methyl ethyl ketone, a polyol having a siloxane structure (SILAPLANE FM-4411 (number average molecular weight was 1,000); produced by Chisso Corporation) (1.50 parts) and 1,4-butane diol (23.0 parts) were agitated and dissolved sufficiently. Isophorone diisocyanate (37.0 parts) and carboxylic acid modified polycaprolactone diol (35.5 parts) having a number average molecular weight of 500 were added and reaction was effected at 75° C. for 1 hour, so as to obtain an urethane prepolymer solution. The resulting urethane prepolymer solution was cooled to 60° C., and potassium hydroxide aqueous solution was added to neutralize the acid group. Thereafter, cooling to 40° C. was performed, ion-exchanged water was added, and high-speed agitation was performed with a homomixer to effect emulsification. After the emulsification, ethylenediamine (1.30 parts) was added, and a chain extension reaction was effected at 30° C. for 12 hours. When the presence of an isocyanate group became not detected with FT-IR, methyl ethyl ketone was removed by distillation while the polymer solution was heated and decompressed, so that Polyurethane polymer dispersion PU-38, in which the polyurethane polymer was dispersed in water, (the content of the polyurethane polymer was 20.0 percent by mass) was obtained. The weight average molecular weight of the resulting polyurethane polymer was 11,600 and the acid value was 12.6 mgKOH/g. The proportion (percent by mass) of the unit derived from the polyol having a siloxane structure in the polyurethane polymer was 1.5 percent by mass.

Preparation of Polyurethane Polymer Dispersion PU-39

A four neck flask was provided with a thermometer, an agitator, a nitrogen introduction tube, and a cooling tube, and 98.0 g of carboxylic acid modified polycaprolactone diol (PLACCEL 205BA; produced by DAICEL CHEMICAL INDUSTRIES, LTD.), 22.0 g of polyol having a siloxane structure (SILAPLANE FM-4411 (number average molecular weight was 1,000; produced by Chisso Corporation), and 120.0 g of methyl ethyl ketone were put therein. After agitation was performed for 30 minutes, 60.0 g of isophorone diisocyanate was put into the four neck flask, and agitation was performed at room temperature for 1 hour in a nitrogen atmosphere. The temperature was raised to 70° C., and reaction was effected for 4 hours. After the reaction, cooling to room temperature was performed, so as to obtain an urethane prepolymer solution having a concentration of 60 percent by mass. Then, 17.6 g of 50 percent by mass KOH aqueous solution and 350 g of ion-exchanged water were put into the four neck flask and were agitated together with 250 g of urethane prepolymer solution at room temperature for 30 minutes. The temperature was raised to 80° C. in a nitrogen atmosphere and, thereafter, a chain extension reaction was effected at 80° C. for 2 hours. After the reaction, methyl ethyl ketone and a part of water were removed by using a rotary evaporator and an aspirator, and ion-exchanged water was added in such a way that the amount of recovery became 429 g, so that Polyurethane polymer dispersion PU-39 having a polyurethane polymer content of 35 percent by mass was obtained. The acid value of the resulting polyurethane polymer was 74.0 mgKOH/g and the weight average molecular weight (Mw) was 18,000.

Preparation of Polyurethane Polymer Dispersion PU-40

The polymer was synthesized by using a one-step addition reaction. A reactor was charged with 1-methyl-2-pyrrolidinone (141 g), acetone (165 g), and dimethylol propionic acid (30.6 g), the resulting mixture was heated to 65° C. and was kept until all dimethylol propionic acid was dissolved. A polyester diol (adipic acid/hexane diol/isophthalic acid) (559.4 g) was added and the components were mixed until a homogeneous mixture was formed. Isophorone diisocyanate (210.1 g) was added over 15 minutes with an addition funnel, followed by 1-methyl-2-pyrrolidinone (42.9 g) serving as a rinse. The temperature was raised to 75° C. and was kept until the reaction between the isocyanate group and the hydroxyl group was completed. The resulting reaction mixture was cooled to 30° C., a 50% 1-dimethylamino-2-propanol (42.5 g) aqueous solution (1,258 g) was added, and a low molecular weight styrene/allyl alcohol polymer (Lyondell SAA101) (199.9 g) in Dowanol DPM (372 g) was added. Furthermore, DI water was added over 15 minutes, so as to effect inversion. Immediately after water was added, a 6.25% ethylenediamine aqueous solution (314 g) was added over 5 minutes to elongate the chain. Finally, acetone was distilled under reduced pressure. Regarding the resulting polyurethane polymer, the acid value was 21.4 mgKOH/g, the content of the polyurethane polymer was 32 percent by mass, and the average particle diameter was 200 to 400 nm.

Preparation of Pigment Dispersion

Preparation of Pigment Dispersion A

Commercially available Cab-O-Jet400 (produced by Cabot) serving as a self-dispersing pigment was diluted with water and was agitated sufficiently, so as to obtain Pigment dispersion A. The content of the pigment in the resulting pigment dispersion was 10.0 percent by mass, the pH was 9.0, and the average particle diameter of the pigment was 110 nm.

Preparation of Pigment Dispersion B

In the state of being cooled to 5° C., 1.5 g of 4-amino-1,2-benzenedicarboxylic acid was added to a solution in which 5 g of concentrated hydrochloric acid was dissolved in 5.5 g of water. Subsequently, a container holding the resulting solution was put into an ice bath, so that the solution was brought into the state of being kept at 10° C. or lower constantly, and a solution in which 1.8 g of sodium nitrite was dissolved in 9 g of water at 5° C. was added thereto. The resulting solution was agitated for further 15 minutes and 6 g of carbon black having a specific surface area of 220 m$^2$/g and a DBP oil absorption of 105 ml/100 g was added under agitation. Thereafter, agitation was performed for further 15 minutes, the resulting slurry was filtrated with filter paper (trade name: Standard Filter Paper No. 2; produced by Advantec), and particles were washed with water sufficiently. These were dried in an oven at 110° C., so that self-dispersing carbon black was prepared. Moreover, a dispersion was prepared by adding water to the resulting self-dispersing carbon black and dispersing in such a way that the content of the pigment became 10.0 percent by mass. According to the above-described method, a pigment dispersion in the state in which the self-dispersing carbon black formed by attaching the —$C_6H_3$—$(COONa)_2$ group to the surfaces of carbon black particles was dispersed in water was obtained. Then, sodium ions in the pigment dispersion were substituted with potassium ions by using an ion exchanging method and, thereby, Pigment dispersion B in which self-dispersing carbon black formed by attaching the —$C_6H_3$—$(COOK)_2$ group to the surface of carbon black was dispersed was obtained. The content of the pigment in the resulting pigment dispersion was 10.0 percent by mass, the pH was 8.0, and the average particle diameter of the pigment was 80 nm.

Preparation of Pigment Dispersion C

A reactor was charged with 500 g of carbon black having a specific surface area of 220 m$^2$/g and a DBP oil absorption of 112 mL/100 g, 45 g of aminophenyl(2-sulfoethyl)sulfone, and 900 g of distilled water, and agitation was performed at a temperature of 55° C. and the number of revolutions of 300 rpm for 20 minutes. Subsequently, 40 g of 25% sodium nitrate was dropped over 15 minutes, 50 g of distilled water was further added, and a reaction was effected at 60° C. for 2 hours. The resulting reaction product was taken out while being diluted with distilled water, so as to adjust in such a way that the solid content became 15.0 percent by mass. A centrifugal separation treatment and a refining treatment were performed to remove impurities and, thereby, Dispersion (1) was obtained. The carbon black in the Dispersion (1) was in the state in which a functional group of aminophenyl(2-sulfoethyl)sulfone was attached to the surface. The number of moles of the functional group attached to the carbon black in the Dispersion (1) was determined as described below. The sodium ion in the Dispersion (1) was measured with a probe type sodium electrode, the resulting value was converted to a value per mole of carbon black powder and the number of moles of functional group attached to the carbon black was determined. Then, the Dispersion (1) was dropped into a pentaethylenehexamine solution. At this time, the pentaethylenehexamine solution was kept at room temperature while being agitated vigorously, and Dispersion (1) was dropped over 1 hour. The content of the pentaethylenehexamine was specified to be 1 to 10 times the number of moles of sodium ion measured in advance, and the amount of the solution was specified to be equal to the amount of Dispersion (1). After the resulting mixture was agitated for 18 to 48 hours, a refining treatment was performed, so as to obtain Dispersion (2) having a solid content of 10.0 percent by mass. The carbon black in the Dispersion (2) was in the state in which pentaethylenehexamine was attached to the surface.

Next, 190 g of styrene-acrylic acid polymer having a weight average molecular weight of 8,000, an acid value of 140.0 mgKOH/g, a polydispersity Mw/Mn (weight average molecular weight Mw, number average molecular weight Mn) of 1.5 was weighed. A styrene-acrylic acid polymer was prepared by adding 1,800 g of distilled water thereto, adding potassium hydroxide required to neutralize the polymer, and agitating to dissolve the polymer. Subsequently, 500 g of Dispersion (2) was dropped into the styrene-acrylic acid polymer aqueous solution obtained as described above. The resulting mixture of Dispersion (2) and the styrene-acrylic acid polymer aqueous solution was transferred to an evaporating dish and was heated at 150° C. for 15 hours, so as to be dried. The dried material was cooled to room temperature.

The dried material obtained as described above was added to distilled water exhibiting a pH of 9.0 which was adjusted by using potassium hydroxide. Dispersion was performed by using a dispersing machine, and the pH of the liquid was adjusted to be 10 to 11 by adding 1.0 N potassium hydroxide aqueous solution under agitation. Then, demineralization and a refining treatment were performed to remove impurities and coarse particles. According to the above-described method, Pigment dispersion C in the state in which polymer-attached self-dispersing carbon black was dispersed in water was obtained. The content of the pigment in Pigment dispersion C prepared as described above was 10.0 percent by mass, the pH was 10.1, and the average particle diameter of the pigment was 130 nm.

Preparation of Pigment Dispersion D

A styrene-acrylic acid copolymer having an acid value of 200.0 mgKOH/g and a weight average molecular weight of 10,000 was neutralized with a 10% potassium hydroxide aqueous solution. Thereafter, 20 parts of the resulting polymer, 10 parts of carbon black having a specific surface area of 210 m$^2$/g and a DBP oil absorption of 74 mL/100 g, and 70 parts of water were mixed. The resulting mixture was dispersed over 1 hour by using a sand grinder and was subjected to a centrifugal separation treatment to remove coarse particles. Pressure filtration was performed with a microfilter having a pore size of 3.0 μm (produced by Fuji Photo Film Co., Ltd.). According to the above-described method, Pigment dispersion D in the state in which polymer-dispersing carbon black was dispersed in water was obtained. The content of the pigment in Pigment dispersion D prepared as described above was 10.0 percent by mass, the pH was 10.0, and the average particle diameter of the pigment was 120 nm.

Preparation of Pigment Dispersion E

A mixed solution was prepared having a composition of 175 parts of n-butyl methacrylate, 10.5 parts of n-butyl acrylate, 37.5 parts of beta-hydroxyethyl methacrylate, 26.8 parts of methacrylic acid, and 20 parts of tert-butyl peroxyoctoate. The mixed solution obtained as described above was dropped on 250 parts of methyl ethyl ketone, which was heated to 75° C. in nitrogen atmosphere under agitation, over 2 hours. The temperature of the solution was maintained at 75° C. and a reaction was effected for 15 hours, so as to prepare a polymer solution. Water was added to 11.6 parts of the resulting polymer solution, 1.6 parts of diethanolamine, and 30 parts of carbon black (Black Pearls 880 produced by Cabot Corporation, USA), so that the total amount became 150 parts. Then, 500 g of zirconia beads having an average particle diameter of 0.5 mm were added to the resulting solution, and kneading was performed with a paint shaker for 4 hours. Thereafter, zirconia beads were separated through filtration, so as to obtain a dispersion containing a polymer and carbon black. The resulting dispersion was diluted by a factor of 2 by further adding water. Under agitation, 1 N hydrochloric acid was added, wherein hydrochloric acid was dropped until carbon black particles were covered with the polymer to form microcapsules. At this time, the pH of the liquid was 3 to 5. Subsequently, suction filtration was performed, and the salt was washed with water, so as to obtain a water-containing cake. Then, 10% diethanolamine aqueous solution was added in such a way that the pH of the liquid became 8.5 to 9.5. The resulting liquid was agitated for 1 hour, and water was added, so that Pigment dispersion E, in which carbon black particles were in the state of being in microcapsules, was obtained. The content of the pigment in Pigment dispersion E prepared as described above was 10.0 percent by mass, the pH was 9.0, and the average particle diameter of the pigment was 102 nm.

Pigment Dispersion F

Pigment dispersion F in the state in which a polymer-dispersing magenta pigment was dispersed in water was obtained in the same manner as Pigment dispersion D described above except that the carbon black was changed to C. I. Pigment Blue 15:3. The content of the pigment in Pigment dispersion F prepared as described above was 10 percent by mass, the pH was 9.5, and the average particle diameter of the pigment was 95 nm.

Pigment Dispersion G

Pigment dispersion G in the state in which a polymer-dispersing magenta pigment was dispersed in water was obtained in the same manner as Pigment dispersion D described above except that the carbon black was changed to C. I. Pigment Red 122. The content of the pigment in Pigment dispersion G prepared as described above was 10 percent by mass, the pH was 10.0, and the average particle diameter of the pigment was 100 nm.

Preparation of Ink

Ink 1

Pigment dispersion A and Polyurethane polymer dispersion PU-1 obtained as described above were mixed with the following individual components, and were agitated sufficiently so as to disperse. Thereafter, pressure filtration was performed with a membrane filter (HDCII Filter; produced by Pall Corporation) having a pore size of 1.2 μm to prepare Ink 1.

| | |
|---|---|
| Pigment dispersion A (pigment content was 10.0 percent by mass) | 30.0 parts |
| Polyurethane polymer dispersion PU-1 (polymer content was 20.0 percent by mass) | 4.5 parts |
| Glycerin | 9.0 parts |
| Diethylene glycol | 5.0 parts |
| Polyethylene glycol (number average molecular weight 1,000) (PEG1000) | 5.0 parts |
| Acetylenol EH (surfactant: produced by Kawaken Fine Chemicals Co., Ltd.) | 0.1 parts |
| Ion-exchanged water | 46.4 parts |

Inks 2 to 40

Inks 2 to 40 were obtained in the same manner as Ink 1 except that Polyurethane polymer dispersion PU-1 was changed to PU-2 to Pu-40.

Inks 41 to 46

Inks 41 to 46 were obtained in the same manner as Ink 1 except that Pigment dispersion A was changed to Pigment dispersions B to G.

Inks 47 to 51

Inks 47 to 51 were obtained in the same manner as Ink 1 except that the ratio of the content (percent by mass) of the polyurethane polymer to the content (percent by mass) of the above-described pigment relative to the total mass of the ink (content (percent by mass) of polyurethane polymer/content (percent by mass) of pigment) was adjusted to become the value shown in Table 3.

Inks 52 and 53

Inks 52 and 53 were obtained in the same manners as Inks 1 and 43 except that Polyurethane polymer dispersion PU-1 was changed to 0 parts, and the ion-exchanged water was changed to 50.9 parts.

Ink 54

Ink 54 was obtained in the same manner as Ink 1 except that the water-soluble organic solvent in the ink composition was changed from PEG1000 to triethylene glycol (TEG).

Evaluation

According to aspects of the present invention, regarding the evaluation criteria in the following individual evaluation items, AA to B were favorable levels, and C and D were unacceptable levels. Each of the following evaluations were performed by using an ink jet recording apparatus PIXUS iP3100 (produced by CANON KABUSHIKI KAISHA). The recording condition was specified to be the temperature of 23° C., the relative humidity of 55%, and the amount of ejection per droplet of 28 ng ± within 10%. Regarding the above-described ink jet recording apparatus, the condition in which one droplet of about 28 ng of ink is applied in a unit region of $1/600$ inch×$1/600$ inch, where the resolution is 600 dpi×600 dpi, is defined as a recording duty of 100%.

(1) Ink Ejection Stability

Each of the inks obtained as described above was filled into an ink cartridge, and the ink cartridge was mounted on the ink jet recording apparatus PIXUS iP3100 (produced by CANON KABUSHIKI KAISHA). Then, 10 sheets of solid image (image with recording duty of 100%) of 19 cm×26 cm were printed on A4-size PPC Paper GF500 (produced by CANON KABUSHIKI KAISHA). At this time, the ink ejection stability was evaluated by visually observing images of the fifth and the tenth solid images. The evaluation criteria of the ink ejection stability were as described below. The evaluation results are shown in Table 3.

- AA: The fifth image was recorded normally. Regarding the tenth image, there were white streaks and faint streaking, but they were at acceptable levels.
- A: Regarding the fifth image, there were white streaks and faint streaking slightly, but they were at almost unobtrusive levels. Regarding the tenth image, there were white streaks and faint streaking, but they were at acceptable levels.
- B: Regarding the fifth and the tenth images, there were white streaks and faint streaking slightly, but they were at acceptable levels.
- C: Regarding the fifth and the tenth images, there were white streaks and faint streaking.
- D: Ejection was unstable and an image was not recorded normally.

(2) Retained Water Resistance

Each of the inks obtained as described above was filled into an ink cartridge, and the ink cartridge was mounted on the ink jet recording apparatus PIXUS iP3100 (produced by CANON KABUSHIKI KAISHA). Then, a solid image (image with recording duty of 100%) of 19 cm×26 cm was printed on three types of recording media of (a) A4-size PPC Paper GF500 (produced by CANON KABUSHIKI KAISHA), (b) A4-size Xerox Paper 4200 (produced by Xerox Corporation), and (c) A4-size High Resolution Paper HR-101 (produced by CANON KABUSHIKI KAISHA). Each of the resulting solid images was stood for 1 hour, 1 mL of ion-exchanged water was dropped on the solid image, and after 60 seconds, the ion-exchanged water was absorbed by using Silbon paper. Subsequently, the state of the ink remaining on the solid image was visually observed to evaluate the retained water resistance of the image. The evaluation criteria of the retained water resistance of the image were as described below. The evaluation results are shown in Table 3.

- AA: Regarding three types of recording media, the ink was not eluted or the ink was eluted slightly, but the trace of water droplet was at an almost unobtrusive level.
- A: Regarding two types of recording media, the ink was not eluted or the ink was eluted slightly, but the trace of water droplet was at an almost unobtrusive level. Regarding one type of recording medium, ink was eluted and the trace of water droplet was recognized slightly.
- B: Regarding one type of recording medium, the ink was not eluted or the ink was eluted slightly, but the trace of water droplet was at an almost unobtrusive level. Regarding two types of recording media, ink was eluted and the trace of water droplet was recognized slightly.
- C: Regarding three types of recording media, ink was eluted. Regarding two types of recording media, the trace of water droplet was recognized slightly. Regarding one type of paper, ink was eluted, so that contamination on a white ground portion of the recording medium was conspicuous.
- D: Regarding three types of recording media, ink was eluted. Regarding two types of recording media, ink was eluted, so that contamination on a white ground portion of the recording medium was conspicuous.

(3) Property of Preventing Feathering Phenomenon

Each of the inks obtained as described above was filled into an ink cartridge, and the ink cartridge was mounted on the ink jet recording apparatus PIXUS iP3100 (produced by CANON KABUSHIKI KAISHA). Then, characters "ABC" (6 points, bold) were printed on three types of recording media of (a) A4-size PPC Paper GF500 (produced by CANON KABUSHIKI KAISHA), (b) A4-size Xerox Paper 4200 (produced by Xerox Corporation), and (c) A4-size High Resolution Paper HR-101 (produced by CANON KABUSHIKI KAISHA). The evaluation criteria of the property of preventing feathering phenomenon were as described below. The evaluation results are shown in Table 3.

- AA: Regarding three types of recording media, feathering phenomenon did not occur.
- A: Regarding two types of recording media, feathering phenomenon did not occur. Regarding one type of recording medium, blurring occurred slightly.
- B: Regarding one type of recording medium, feathering phenomenon did not occur. Regarding two types of recording media, blurring occurred slightly.
- C: Regarding two types of recording media, blurring occurred slightly. Regarding one type of recording medium, feathering phenomenon occurred.
- D: Regarding at least two types of recording media, feathering phenomenon occurred.

(4) Highlighter Resistance

Each of the inks obtained as described above was filled into an ink cartridge, and the ink cartridge was mounted on the ink jet recording apparatus PIXUS iP3100 (produced by CANON KABUSHIKI KAISHA). Then, a vertical ruled line having a thickness of $1/10$ inch was recorded on PPC Paper GF500 (produced by CANON KABUSHIKI KAISHA). Marking was performed on the vertical ruled line portion on the recorded image with a yellow line marker OPTEX2 (produced by ZEBRA CO., Ltd.). Immediately after that, marking was performed on a white ground portion on the image, and contamination of a pen nib and contamination of the marking on the white ground portion were examined. The above-described evaluation was performed at each of 5 minutes and 1 day after recording. The evaluation criteria of the highlighter resistance are as described below. The evaluation results are shown in Table 3.

- A: In the test after five minutes, although a slight coloring on the pen nib was observed, little contamination of the line on the white ground was observed. In the test after one day, there were no contamination of the pen nib and no contamination of the line on the white ground.

B: In the test after five minutes and the test after one day, although a slight coloring on the pen nib was observed, little contamination of the line on the white ground was observed.

C: In the test after five minutes, there were coloring of the pen nib and contamination of the line on the white ground. In the test after one day, there were no contamination of the pen nib and no contamination of the line on the white ground.

D: In the test after five minutes and the test after one day, there were coloring of the pen nib and contamination of the line on the white ground.

(5) Scratch Resistance

Each of the inks obtained as described above was filled into an ink cartridge, and the ink cartridge was mounted on the ink jet recording apparatus PIXUS iP3100 (produced by CANON KABUSHIKI KAISHA). Then, a black solid image (image with recording duty of 100%) of 1 inch×0.5 inches was printed on A4-size PPC Paper GF500 (produced by CANON KABUSHIKI KAISHA). Silbon paper and a balance weight having a bearing stress of 40 g/cm$^2$ were placed on the resulting solid image, and the solid image and the Silbon paper were rubbed against each other. Thereafter, Silbon paper and the balance weight were removed, and the extent of stain of the solid image and transfer of Silbon paper to the white ground portion were visually observed. In this regard, the above-described evaluations were performed at 10 minutes after recording and 1 day after recording by using different solid images. The evaluation criteria of the scratch resistance are as described below. The evaluation results are shown in Table 3.

A: At 10 minutes after, stain of the white ground portion was observed to some extent, but was at an almost unobtrusive level. At 1 day after, stain of the white ground portion was not observed.

B: At 10 minutes after and 1 day after, stain of the white ground portion was observed to some extent, but was at an almost unobtrusive level.

C: At 10 minutes after, stain of the white ground portion was observed. At 1 day after, stain of the white ground portion was observed to some extent, but was at an almost unobtrusive level.

D: At 10 minutes after and 1 day after, stain of the white ground portion was observed.

TABLE 3

Preparation condition of ink and evaluation result

| | | | Ink composition | | | Evaluation result | | | |
|---|---|---|---|---|---|---|---|---|---|
| Example No. | Ink No. | PU-No. | Pigment dispersion | Water-soluble organic solvent | Content of polyurethane polymer/Content of pigment | (1) Ink ejection stability | (2) Retained water resistance | (3) Property of preventing feathering phenomenon | (4) Highlighter resistance | (5) Scratch resistance |
| Example 1 | 1 | PU-1 | A | PEG1000 | 0.3 | A | AA | AA | A | A |
| Example 2 | 4 | PU-4 | A | PEG1000 | 0.3 | A | AA | AA | A | A |
| Example 3 | 5 | PU-5 | A | PEG1000 | 0.3 | AA | A | A | B | B |
| Example 4 | 8 | PU-8 | A | PEG1000 | 0.3 | A | A | A | B | B |
| Example 5 | 9 | PU-9 | A | PEG1000 | 0.3 | A | A | A | A | A |
| Example 6 | 10 | PU-10 | A | PEG1000 | 0.3 | A | A | A | A | A |
| Example 7 | 11 | PU-11 | A | PEG1000 | 0.3 | A | A | A | B | B |
| Example 8 | 12 | PU-12 | A | PEG1000 | 0.3 | A | B | B | A | A |
| Example 9 | 13 | PU-13 | A | PEG1000 | 0.3 | A | A | A | A | A |
| Example 10 | 14 | PU-14 | A | PEG1000 | 0.3 | A | AA | AA | A | A |
| Example 11 | 15 | PU-15 | A | PEG1000 | 0.3 | A | AA | AA | A | A |
| Example 12 | 16 | PU-16 | A | PEG1000 | 0.3 | B | AA | AA | A | A |
| Example 13 | 17 | PU-17 | A | PEG1000 | 0.3 | B | AA | AA | A | A |
| Example 14 | 18 | PU-18 | A | PEG1000 | 0.3 | B | AA | AA | A | A |
| Example 15 | 19 | PU-19 | A | PEG1000 | 0.3 | A | AA | AA | A | A |
| Example 16 | 20 | PU-20 | A | PEG1000 | 0.3 | A | AA | AA | A | A |
| Example 17 | 21 | PU-21 | A | PEG1000 | 0.3 | A | AA | AA | A | A |
| Example 18 | 22 | PU-22 | A | PEG1000 | 0.3 | A | AA | AA | B | B |
| Example 19 | 23 | PU-23 | A | PEG1000 | 0.3 | A | AA | AA | A | A |
| Example 20 | 24 | PU-24 | A | PEG1000 | 0.3 | B | AA | AA | B | B |
| Example 21 | 25 | PU-25 | A | PEG1000 | 0.3 | B | AA | AA | B | B |
| Example 22 | 26 | PU-26 | A | PEG1000 | 0.3 | B | AA | AA | A | A |
| Example 23 | 27 | PU-27 | A | PEG1000 | 0.3 | A | AA | AA | A | A |
| Example 24 | 28 | PU-28 | A | PEG1000 | 0.3 | A | AA | AA | A | A |
| Example 25 | 29 | PU-29 | A | PEG1000 | 0.3 | A | AA | AA | A | A |
| Example 26 | 30 | PU-30 | A | PEG1000 | 0.3 | A | AA | AA | A | A |
| Example 27 | 31 | PU-31 | A | PEG1000 | 0.3 | B | AA | AA | A | A |
| Example 28 | 32 | PU-32 | A | PEG1000 | 0.3 | A | B | B | B | B |
| Example 29 | 41 | PU-1 | B | PEG1000 | 0.3 | A | AA | AA | A | A |
| Example 30 | 42 | PU-1 | C | PEG1000 | 0.3 | A | AA | AA | A | A |
| Example 31 | 43 | PU-1 | D | PEG1000 | 0.3 | A | AA | AA | A | A |
| Example 32 | 44 | PU-1 | E | PEG1000 | 0.3 | A | AA | AA | A | A |
| Example 33 | 45 | PU-1 | F | PEG1000 | 0.3 | A | AA | AA | A | A |
| Example 34 | 46 | PU-1 | G | PEG1000 | 0.3 | A | AA | AA | A | A |
| Example 35 | 47 | PU-1 | A | PEG1000 | 0.09 | A | A | A | A | A |
| Example 36 | 48 | PU-1 | A | PEG1000 | 0.1 | A | AA | AA | A | A |
| Example 37 | 49 | PU-1 | A | PEG1000 | 1.0 | A | AA | AA | A | A |
| Example 38 | 50 | PU-1 | A | PEG1000 | 1.2 | B | AA | AA | A | A |
| Example 39 | 51 | PU-1 | A | PEG1000 | 2.0 | B | AA | AA | A | A |
| Example 40 | 54 | PU-1 | A | TEG | 0.3 | A | A | A | A | A |
| Comparative example 1 | 2 | PU-2 | A | PEG1000 | 0.3 | D | AA | AA | B | B |

TABLE 3-continued

Preparation condition of ink and evaluation result

| Example No. | Ink No. | PU-No. | Pigment dispersion | Water-soluble organic solvent | Content of polyurethane polymer/ Content of pigment | (1) Ink ejection stability | (2) Retained water resistance | (3) Property of preventing feathering phenomenon | (4) Highlighter resistance | (5) Scratch resistance |
|---|---|---|---|---|---|---|---|---|---|---|
| Comparative example 2 | 3 | PU-3 | A | PEG1000 | 0.3 | C | AA | AA | B | B |
| Comparative example 3 | 6 | PU-6 | A | PEG1000 | 0.3 | AA | C | B | C | B |
| Comparative example 4 | 7 | PU-7 | A | PEG1000 | 0.3 | AA | C | C | C | C |
| Comparative example 5 | 33 | PU-33 | A | PEG1000 | 0.3 | D | D | D | D | D |
| Comparative example 6 | 34 | PU-34 | A | PEG1000 | 0.3 | A | D | D | D | D |
| Comparative example 7 | 35 | PU-35 | A | PEG1000 | 0.3 | D | B | B | D | D |
| Comparative example 8 | 36 | PU-36 | A | PEG1000 | 0.3 | A | B | B | D | D |
| Comparative example 9 | 37 | PU-37 | A | PEG1000 | 0.3 | A | C | C | C | B |
| Comparative example 10 | 38 | PU-38 | A | PEG1000 | 0.3 | D | C | C | C | B |
| Comparative example 11 | 39 | PU-39 | A | PEG1000 | 0.3 | A | C | C | C | B |
| Comparative example 12 | 40 | PU-40 | A | PEG1000 | 0.3 | D | C | C | A | A |
| Comparative example 13 | 52 | — | A | PEG1000 | — | AA | D | D | D | D |
| Comparative example 14 | 53 | — | G | PEG1000 | — | AA | D | D | D | D |

Examples 41 and 42, Comparative example 15

Each of Ink 1 and Ink 45 as Example 1, Ink 1 and Ink 53 as Example 42, and Ink 52 and Ink 53 as Comparative example 15 was filled into an ink cartridge, and the ink cartridge was mounted on the ink jet recording apparatus PIXUS iP3100 (produced by CANON KABUSHIKI KAISHA). Then, a solid image was printed, where the recording duty of each of two inks was specified to be 50%, and the recording duty of the two inks in total was specified to be 100%. In this regard, in the case where an image of secondary color was recorded, at each recording duty, the mass ratio of the amounts of application of the individual inks was specified to be 1:1, and in the same recording pass, the individual inks were applied to the same position. Subsequently, regarding the resulting solid image, evaluation was performed in a manner similar to the evaluation methods and criteria in the above-described (2) Retained water resistance, (3) Property of preventing feathering phenomenon, (4) Highlighter resistance, and (5) Scratch resistance. The evaluation results are shown in Table 4.

TABLE 4

Ink combination and evaluation result

| Example No. | Ink combination | | (2) Retained water resistance | (3) Property of preventing feathering phenomenon | (4) Highlighter resistance | (5) Scratch resistance |
|---|---|---|---|---|---|---|
| Example 41 | Ink 1 | Ink 45 | AA | AA | A | A |
| Example 42 | Ink 1 | Ink 53 | AA | AA | B | B |
| Comparative example 15 | Ink 52 | Ink 53 | D | D | D | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-153079 filed Jul. 5, 2010, which is hereby incorporated by reference herein in its entirety.

What is claimed is:

1. An ink jet ink comprising:
a pigment and a polyurethane polymer,
wherein the polyurethane polymer has units derived from a polyol having no acid group and having the carbon number of 13 or more and 250 or less, a diol having an acid group and having the carbon number of 1 or more and 7 or less, a polyol having a siloxane structure, and a polyisocyanate, and an acid value of the polyurethane polymer is 40.0 mgKOH/g or more and 80.0 mgKOH/g or less.

2. The ink jet ink according to claim 1, wherein the number average molecular weight of the polyol having no acid group and having the carbon number of 13 or more and 250 or less is within the range of 400 or more and 4,000 or less.

3. The ink jet ink according to claim 1, wherein the proportion (percent by mass) of the unit derived from the polyol having a siloxane structure in the polyurethane polymer is 0.5 percent by mass or more and 5.0 percent by mass or less.

4. The ink jet ink according to claim 1, wherein the mass ratio of the proportion (percent by mass) of the unit derived from the polyol having no acid group and having the carbon number of 13 or more and 250 or less in the polyurethane polymer to the proportion (percent by mass) of the unit derived from the polyol having a siloxane structure is 0.80 times or more and 20.00 times or less.

5. The ink jet ink according to claim 1, wherein the diol having an acid group and having the carbon number of 1 or more and 7 or less is at least one of a compound selected from the group consisting of the compounds represented by General formula (1) and compounds represented by General formula (2):

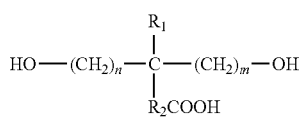

General formula (1)

in General formula (1), $R_1$ represents a hydrogen atom, a methyl group, or an ethyl group, $R_2$ represents an alkylene group having the carbon number of 1 to 3, n represents 1 to 3, and m represents 1 to 3,

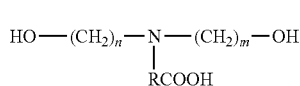

General formula (2)

in General formula (2), R represents an alkylene group having the carbon number of 1 to 4, n represents 1 to 4, and m represents 1 to 4.

6. The ink jet ink according to claim 1, wherein the diol having an acid group and having the carbon number of 1 or more and 7 or less is at least one of dimethylol propionic acid, dimethylol butanoic acid, and N-di(2-hydroxyethyl)glycine.

7. The ink jet ink according to claim 1, wherein the polyol having no acid group and having the carbon number of 13 or more and 250 or less is a polyether polyol.

8. The ink jet ink according to claim 7, wherein the polyether polyol is a polypropylene glycol.

9. The ink jet ink according to claim 1, wherein the polyol having a siloxane structure is an organic compound in which two hydroxyl groups are bonded to a polysiloxane having a repeated structure represented by Formula (I):

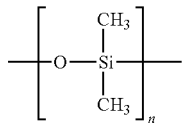

Formula (I)

in Formula (I), n represents 4 or more and 60 or less.

10. The ink jet ink according to claim 1, comprising a polyethylene glycol having a number average molecular weight of 400 or more and 2,000 or less.

11. An ink jet recording method comprising the step of ejecting an ink from an ink jet method recording head to perform recording on a recording medium, wherein the ink is the ink jet ink according to claim 1.

12. An ink cartridge comprising an ink storage portion to store an ink, wherein the ink stored in the ink storage portion is the ink jet ink according to claim 1.

13. The ink jet ink according to claim 1, wherein the weight average molecular weight of the polyurethane polymer is 28,000 or more and 60,000 or less.

* * * * *